Oct. 17, 1939.  S. W. BORDEN  2,176,756
CONDUCTOR EXPLORING COIL
Filed April 2, 1938  2 Sheets-Sheet 1

Oct. 17, 1939.    S. W. BORDEN    2,176,756
CONDUCTOR EXPLORING COIL
Filed April 2, 1938    2 Sheets-Sheet 2

Stephen W. Borden, Inventor

Patented Oct. 17, 1939

2,176,756

UNITED STATES PATENT OFFICE 2,176,756

CONDUCTOR EXPLORING COIL

Stephen W. Borden, Summit, N. J.

Application April 2, 1938, Serial No. 199,627

1 Claim. (Cl. 175—183)

My invention relates to apparatus for detecting the presence of a tracer current in an electrical conductor. By the term "tracer current," I refer to a current sent through a conductor either for the purpose of assisting in identifying the conductor when it is one of a group of several similar conductors or for the purpose of locating a fault in the insulation of the conductor, the circuit being so arranged that the tracer current leaves the conductor at the fault.

Various types of tracer currents have been used, ranging from straight direct current to high-frequency alternating current and including pulsating currents, but as far as I am aware a swing current has not previously been employed for this purpose. A detailed definition and description of swing current and swing current meters and their use for testing will be found in my co-pending application, Serial No. 199,625.

One of the objects of my invention is to provide a pickup coil having an adjustable iron core which may be conformed, more or less, to the size and shape of a conductor enclosure and means of sensitizing the core to increase the efficiency of the pickup coil and also the combination of one or more of these elements with a swing current meter for detecting the presence of swing current in a conductor.

Figure 1:
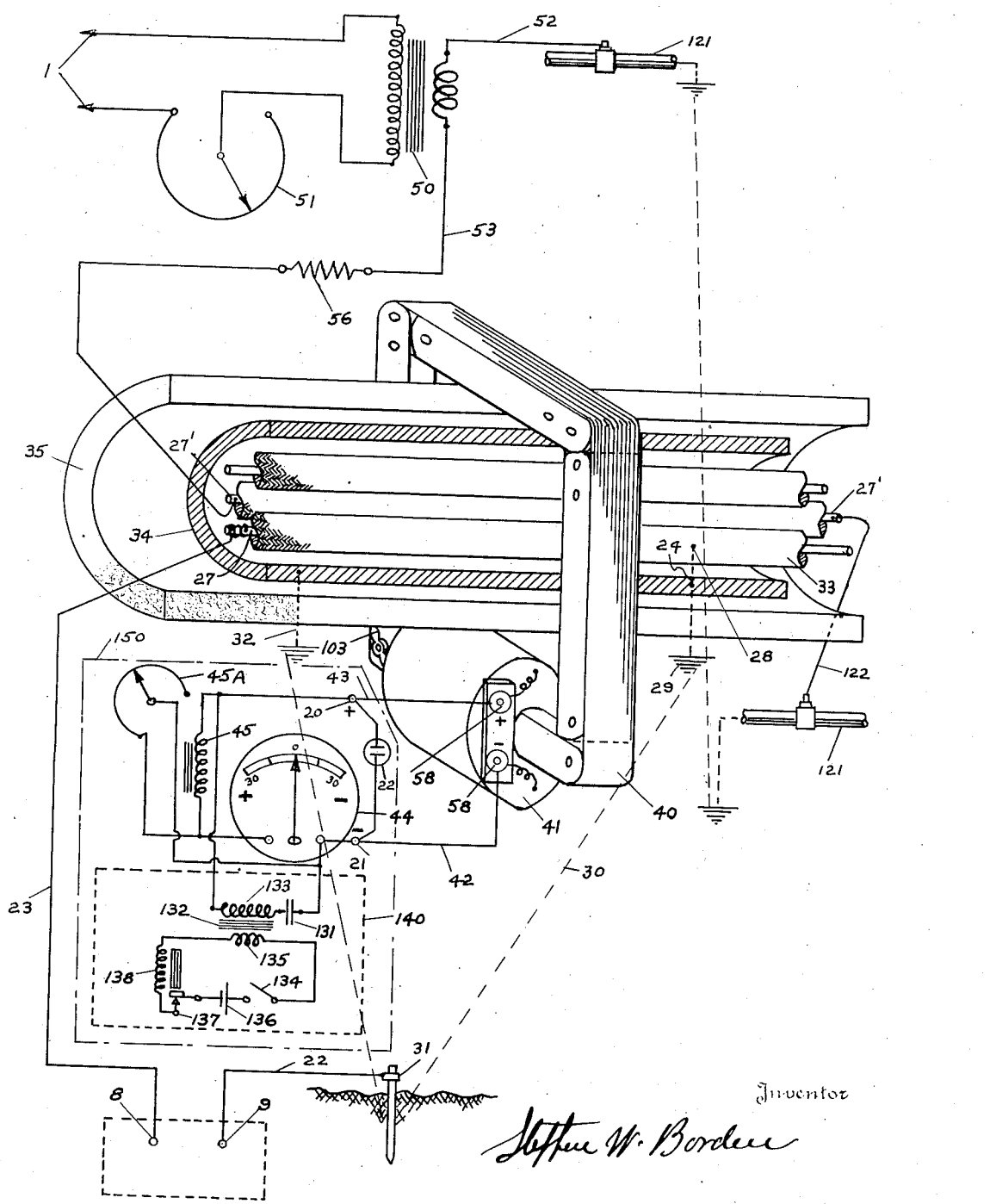

In the drawings, Fig. 1 is more or less schematic and shows the various devices employed and the manner in which they are connected up for locating a fault. Figs. 2 to 5 inclusive are details of the flexible iron core and pickup coil.

Referring to the drawings (Fig. 1) binding posts 8 and 9 represent any suitable source of swing current. Several types of swing current generators are described in my co-pending applications, Serial Nos. 199,625, 199,626, 199,630 and 199,632.

27 is an insulated electrical conductor inclosed in a lead sheath 34 and housed in a fiber conduit 35. 28 is a fault which permits current to flow from conductor 27 to ground either directly or via 24 and the lead sheath 34. 40 is an adjustable iron core on which is mounted a coil 41, the terminal leads of which are connected to binding posts 58. 44 is a swing meter and 45 a choke coil in series with the meter. A high resistance volume control 45A is shunted across the meter terminals.

140 is a sensitizing device consisting of a transformer 132 having a high voltage secondary 133 which, with a condenser 131 in series, is shunted across coil 41; and a primary winding 135 which may be supplied, via switch 134, with current from a battery, as 136, via an interruptor 137 operated by winding 138. However, winding 135 may be supplied with 60-cycle current in place of the interrupted battery current. 20 and 21 are terminal binding posts to protect the meter against excessive voltage by shunting part of the current flow around the meter when the voltage exceeds the flash point of the lamp.

The equipment within the dotted enclosure 140 is a unitary device having two terminals 20 and 21 for connection to an exterior circuit such as coil 41 or some other source of swing current which it is desired to detect or measure.

50 is a transformer for supplying a low voltage current at commercial frequency and whose magnitude may be regulated by rheostat 51. One terminal of the transformer secondary is connected, preferably via resistance as 56, to a non-defective conductor, as 27', and the other terminal connected to ground, as via water pipe 121, the circuit being completed via lead 122 which is connected to the other end of conductor 27'.

Figure 3:
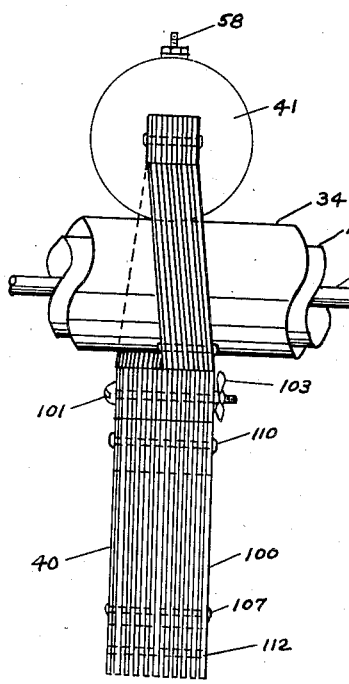
Figure 2:
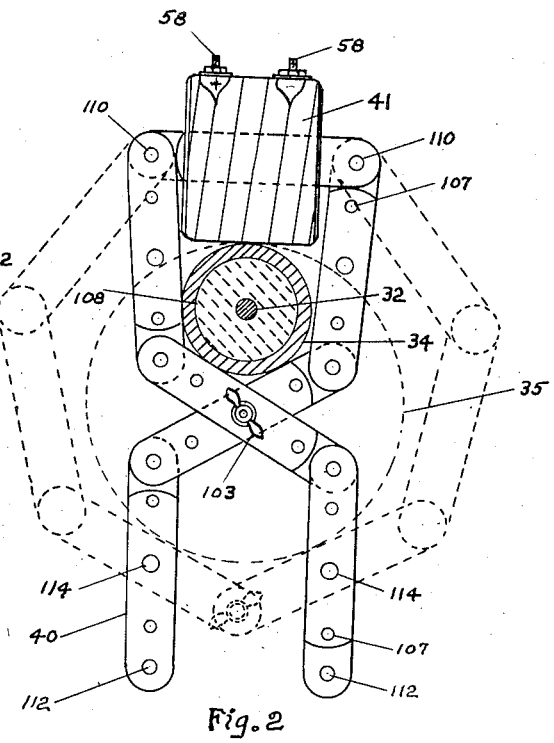

In Fig. 2 the solid line diagram shows the flexible iron core 40 adjusted to inclose a lead-covered conductor 32 which is of relatively small diameter, while the dotted diagram shows the core expanded to inclose a relatively large cable indicated by the circle 35. In practice, the core may be required to encircle cables or their protective covering ranging from .25" to 6" in diameter. It will be understood, of course, that the iron core and pickup coil are more sensitive when the length of the magnetic circuit is relatively short, and it is therefore distinctly advantageous to be able to adjust the length of the magnetic circuit so that the shortest feasible length may be employed for any particular size of conductor or inclosing duct. Fig. 3 is a side elevation of the solid line portion of Fig. 2.

Figure 4:
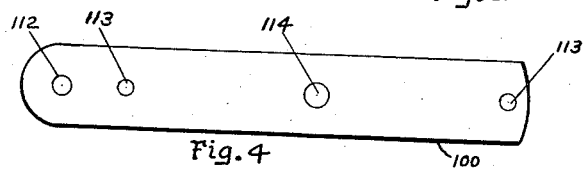
Figure 5:
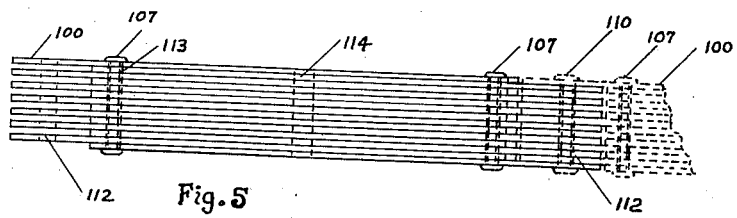

Fig. 4 includes a plan view, on a larger scale, of a single lamination 100, and it will be seen that the entire flexible core is made up from this one form of lamination. Fig. 5 shows the method of assembling the laminations. 107 are tight-fitting rivets, positioned in openings 113, by which the laminations are clamped securely together, while 110 is a loose-fitting rivet, positioned in openings 112, which permits the sections to swivel. However, since the laminations are securely fastened together by rivets 107 positioned on each side of the loose rivet 110, the laminations are necessarily pressed together quite securely in the swivel joints, thus providing a multiplicity of flat and fairly firm contact surfaces for carrying the flux from one section to the next. In the center of each lamination is provided an opening 114 for the reception of a clamping bolt, as 101, for securing any two sections together, for improving the magnetic circuit, as illustrated in Figs. 2 and 3.

I prefer to make the core with a substantially square cross-section, but this is not essential. However, the sections should have flat surfaces on top and bottom which should be at least as wide as the depth of the section in order to provide a suitable flux path when two sections are clamped together, as in Figs. 2 and 3.

The equipment may be used in the following manner. The terminal 8 is connected to conductor 27 via a lead 23 and a tracer current flows through the conductor, thence through fault 28 and ground circuit 29, 30, and 31, and thence via conductor 22 to terminal 9. When the conductor is lead-incased and grounded to the lead, additional return circuits, as 32, may be involved. The iron core 40 is now placed around the outside of whatever enclosure may be provided for the conductor 27 and fastened together by a bolt 101 and nut 103 in such manner as to produce as short a magnetic circuit as feasible. The terminals 58 of the coil 41 are then connected, as by leads 42 and 43, to the posts 20 and 21 of the swing current detector 150. The tracer current flowing in conductor 27 produces a flux in core 40 which in turn generates a potential in coil 41 which is registered on meter 44. Alternating current, of commercial frequency, which may be flowing in lead sheath 34 or through any of the conductors which are surrounded by core 40, will produce a corresponding potential in coil 41, but the choke 45 prevents current of commercial frequency flowing through meter 44 in any appreciable volume and such current as does flow will not register as meter 44 is nonresponsive to currents of commercial frequencies. If the potential exceeds 90 volts lamp 22 becomes conductive.

If we provide a 60-cycle current of approximately 10 amperes, as from source 50, and direct this current through the ungrounded cable 27' and conductor 122 and return it to its source through any circuit which is not inclosed by the core 40, such as water piping 121, we are in effect magnetizing core 40 with 10 ampere-turns of 60-cycle current, and I have found that when this is done the sensitivity of coil 41 and meter 44 in combination is increased about 5-fold; by which I mean that if a given tracer current will produce a deflection of one division on the meter without the sensitizing current, then the swing will be increased to five divisions if this 60-cycle magnetizing current is utilized.

In most cases, a more convenient method of sensitizing the core 40 is by means of a device, as 140, which has already been described and which device will also increase a swing of one division to about five divisions. Of course, it is understood that the sensitizing current of either type has its maximum effectiveness when the tracer current itself is at a minimum and of course is has no particular usefulness when the tracing current is of sufficient magnitude to give the desired indications on the meter without its use.

As pointed out, alternating currents of commercial frequency, flowing in either the lead sheath or one or more of the conductors, will have no appreciable effect upon the operation of the equipment, except to increase its sensitivity, nor will steady flow direct current. Direct current flowing in the lead sheath which varies sharply from time to time will produce potentials in coil 41 which in turn will be reflected in meter 44, but this can only result in causing momentary interruptions or variations in the swing of the needle which, of course, is constantly swinging from one side to the other in step with the swing current frequency. Because of this immunity from interference by commercial current, it is feasible to identify conductors by means of a swing current tracer while they are alive and carrying full load. Lamp 22 flashes over on abrupt and large changes in direct current.

If all or a part of the tracer current entering conductor 27 leaves by fault 28 and returns to terminal 9 by way of 34 and circuit 32, it will be apparent that the effective tracer current will be only the difference between the current flowing in conductor 27 and that flowing in sheath 34. This is a difficulty which is present when any type of inductive pickup device is used, and the usual practice of shunting some of the sheath current around the outside of the core 40 by means of a portable copper shunt applied to the cable sheath is equally applicable regardless of whether swing current or some other type of tracer current is employed.

For purposes of demonstrating the utility of the equipment described, I will give a few examples of the sensitivity obtainable using a swing current of 1.2 cycles per second and a swing current meter which consists of a permanent magnet-type direct current galvanometer having a sensitivity of two microamperes per millimeter division and a potential circuit resistance of 125 ohms. The choke coil 45 is rated at about 1100 henrys and 6000 ohms D. C. resistance. The coil 41 may have a resistance of about 6000 ohms and its current-carrying capacity need be only a few microamperes. The core 40 may conveniently be made of laminations ⅝" wide and built up to a thickness of about ⅝".

If the core be placed around a conductor about as shown in Fig. 2 and the conductor enclosure is about 1" o. d., then, without using any sensitizing current either in conductor 27' or from the sensitizer 140, a current of 100 milliamperes flowing in conductor 27 will produce a swing of approximately one division on meter 44. If the core be expanded to encircle a conductor housing of 6" o. d., then if the conductor carrying the tracer current is located at approximately the center of the housing, a tracer current of 170 milliamperes will produce a deflection of one division on meter 44. In each case, this will be increased to between five and eight divisions by the use of the sensitizing equipment. One-tenth division swing is easily detectable.

It has been demonstrated by careful tests that it is immaterial whether or not the conductor is inclosed in an iron conduit or a steel armor jacket as these coverings have no more effect upon the readings than a similar covering of fiber duct or other nonmagnetic material.

Of course, it will be understood that in actual practice the tracer current generator is located at the generating station or substation or other point at which the cable normally receives its current supply while the tracer pickup equipment is used anywhere along the length of the cable, usually in street manholes where the cables are run underground, and thus is necessarily of a portable nature. The meter 44 and choke coil 45 as well as the complete sensitizing equipment 140 are usually mounted in a suitable carrying case, as 150, and connected to a pair of binding posts, as 20 and 21, which in turn are connected to the posts of pickup coil 41 by flexible leads, as 42 and 43, which may be of any desired length, permitting the meter to be used at the surface of the ground while the pickup coil is used in a manhole.

Since the detector is non-responsive to other than swing current, the conductor under test may be one of two or more conductors of a working circuit but in making such tests it is necessary that all the conductors of the circuit pass through the pickup loop and the system must be free from grounds other than the fault.

While I have described certain features more or less in detail, it will be understood that the invention will employ various devices of differing forms and construction and it is to be understood that the invention is not to be limited except by the scope of the appended claim taken in conjunction with the state of the prior art.

I claim:

Means for detecting swing current in a conductor, which includes an iron core for encircling the conductor, a coil on the core, leads connecting the terminals of the coil with a swing meter, and a sensitizing circuit connected to the terminals of the coil, which circuit includes the high voltage winding of a transformer the primary winding of which is energized by a source of current having a frequency of not less than 50 cycles per second.

STEPHEN W. BORDEN.